United States Patent [19]

Higginbotham

[11] 3,819,317

[45] June 25, 1974

[54] APPARATUS FOR BLOW MOLDING AND INJECTING COOLING GAS

[75] Inventor: Lloyd D. Higginbotham, Williamston, Mich.

[73] Assignee: Haskon Incorporated, Wilmington, Del.

[22] Filed: Oct. 30, 1972

[21] Appl. No.: 301,948

[52] U.S. Cl. ............... 425/387 B, 425/DIG. 204, 425/DIG. 208, 425/806
[51] Int. Cl. ...................... B29c 17/07, B29c 17/12
[58] Field of Search ........... 425/292, 302 B, 305 B, 425/387 B, 806, DIG. 204, DIG. 212, DIG. 208, 326 B, 324 B, 242 B, 342; 264/94, 96, 98; 239/423, 424

[56] References Cited
UNITED STATES PATENTS

| 3,346,196 | 10/1967 | Biber | 239/424 |
| 3,466,702 | 9/1969 | Stenger | 425/DIG. 204 |
| 3,488,801 | 1/1970 | Havely | 425/387 B X |
| 3,500,497 | 3/1970 | Culpepper | 425/387 B |
| 3,649,148 | 3/1972 | Waltman et al. | 264/99 X |
| 3,657,406 | 4/1972 | Delebarre | 425/305 B X |
| 3,735,778 | 5/1973 | Garnier | 239/424 X |

Primary Examiner—J. Spencer Overholser
Assistant Examiner—David B. Smith
Attorney, Agent, or Firm—Finnegan, Henderson, Farabow and Garrett

[57] ABSTRACT

A blow head assembly for a blow molding machine having a rotating blow pin and a mechanism for simultaneously injecting cooling gas and air into the interior of the parison.

4 Claims, 5 Drawing Figures

PATENTED JUN 25 1974 3,819,317

APPARATUS FOR BLOW MOLDING AND INJECTING COOLING GAS

This invention relates to blow molding apparatus and more particularly to a blow head assembly for injecting cooling gas through a fully rotatable blow pin.

The invention is applicable to blow molding apparatus of the general type for forming plastic bottles wherein a soft parison of synthetic, plastic material is extruded between a pair of open mold halves, the mold halves are closed about the parison to pinch shut one end of the parison, and then a blow pin is inserted into the opposite end of the parison to inject air and blow mold the parison against the walls of the mold cavity. The molds remain closed long enough to permit the plastic to set in the shape of the mold cavity and then the molds are separated to discharge the formed plastic bottle.

Conventionally, the blow pin is inserted into the neck-forming area of the mold and is provided with a molding surface that press molds the top of the parison against the mold cavity to form the neck portion of the bottle in contrast to the blow molding of the rest of the bottle. During the molding operation, flash is always left around the neck of the bottle and the more readily this can be removed following the molding operation, the more efficient the machine will operate. Thus, it has been desirable in the past to rotate the blow pin after it enters the mold cavity to impart a cutting action against the mold and sever the flash and smooth the top of the neck portion of the plastic molded bottle.

In addition to rotating the blow pin to increase the efficiency of a blow molding operation, it has also been found desirable to inject a cooling gas with the pressurized air during the blowing step to considerably decrease the period of time required for the parison to set in the shape of the mold cavity, thereby decreasing the molding time and increasing the efficiency of the machine's operation. A particularly effective cooling gas is carbon dioxide if it can be fed in liquid form to a point where it can be discharged simultaneously with the air being injected into the parison. Thus, the carbon dioxide will vaporize inside the parison and provide a maximum cooling effect. The carbon dioxide cannot be mixed with the air prior to its discharge from the blow pin, because not only will the carbon dioxide vaporize prematurely and outside the parison, but it could form ice in the relatively narrow air passages blocking them off and completely destroying the operation of the blow pin.

Accordingly, it is an object of the present invention to provide a blow head assembly for blow molding apparatus that injects a cooling gas, such as carbon dioxide, into a parison axially from the discharge outlet of an axially reciprocating and fully rotatable blow pin. As embodied, and broadly described, the blow head assembly of this invention comprises a collar having an internal cylindrical bore; an axially reciprocating and fully rotatable blow pin mounted within the bore, said pin having an internal axially extending air passage terminating at an air discharge outlet at the bottom of the pin; means for selectively supplying air to the air passage; a cooling gas inlet port located in the collar and opening into the cylindrical bore; an annular groove extending continuously around the outer surface of the blow pin and defining an annular chamber with the inside surface of the cylindrical bore, said groove communicating with the cooling gas inlet port when air is supplied to the air passage regardless of the relative rotational position between the pin and the collar; a radial conduit extending through the pin and communicating with the groove; and a tube communicating with the radial conduit and extending axially down through the air passage to a lower cooling gas outlet end adjacent the air discharge outlet of the pin, said inlet port, annular chamber, radial conduit, and tube being of substantially similar or decreasing crosssectional area to prevent premature vaporization of the cooling gas prior to its discharge from the cooling gas outlet.

The accompanying drawings which are incorporated in and constitute a part of the specification illustrate a preferred embodiment of the invention and together with the description serve to explain the principles of the invention.

Figure 1:
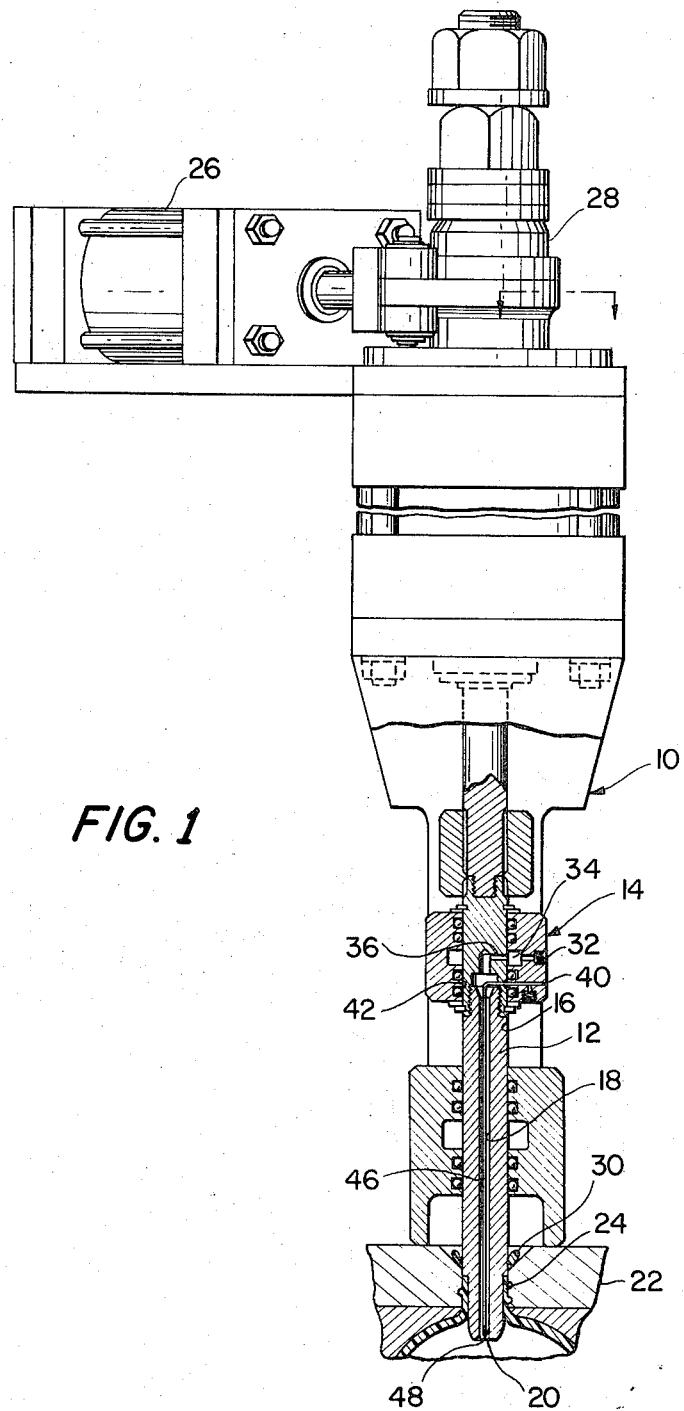
FIG. 1 is a side elevational view of a blow head assembly showing its relation of a mold cavity in blow molding apparatus and constructed according to the present invention.
Figure 2:
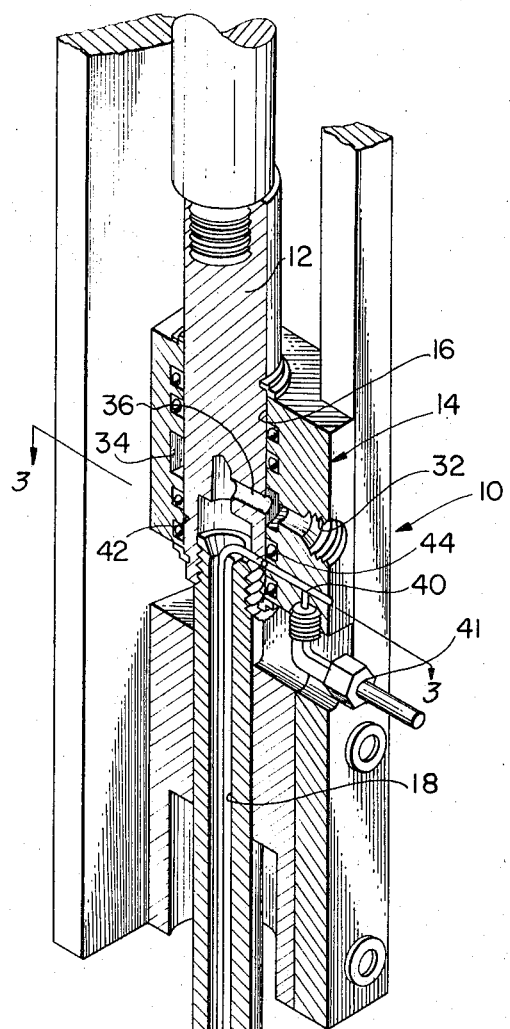
FIG. 2 is an enlarged perspective view of the rotatable blow pin adapted for injecting cooling gas.
Figure 3:
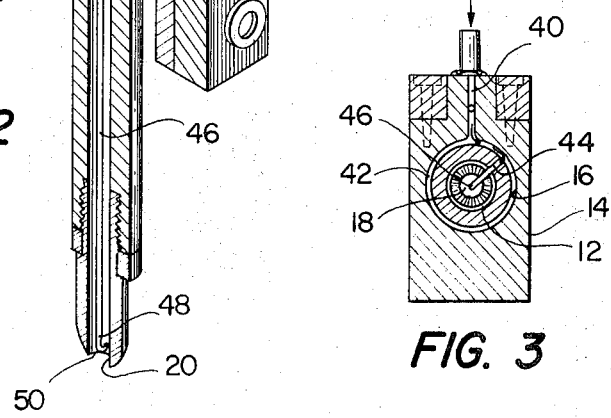
FIG. 3 is a partial sectional view taken along the lines 3—3 of FIG. 2.

As best shown in FIGS. 1 and 2, the blow head assembly, generally 10, includes a blow pin 12 mounted for axial reciprocation in the internal cylindrical bore 16 of an assembly collar 14. Blow pin 12 includes an internal axially extending air passage 18, terminating at an air discharge outlet 20 at the bottom of the pin. As is well known to those skilled in the art of blow molding and as best shown in FIG. 1, when a mold cavity 22 containing an extruded parison is brought underneath the blow head assembly, blow pin 12 is extended into the mold cavity, generally the top of the mold, to press mold the neck portion 24 of the bottle between the blow pin and the cavity and to inject air into the parison and form the rest of the bottle. After the bottle has been formed, the blow pin is pulled back out of the mold cavity to an out-of-the-way position and the bottle released from the mold. Suitable means, not shown, therefore, are provided, controlled by a machine cycling system to extend and retract the blow pin at the required intervals.

Figure 4:
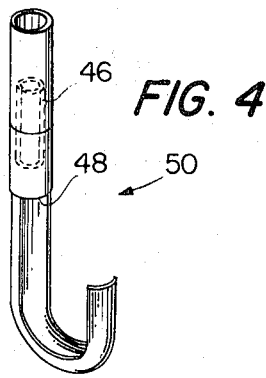
FIG. 4 is a perspective view of the outlet end of the cooling gas tube.
Figure 5:
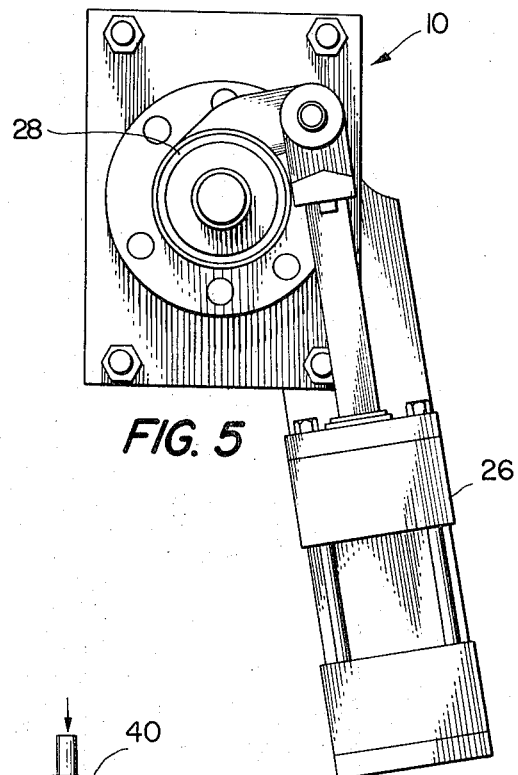
FIG. 5 is a top view of the blow head assembly of FIG. 1.

In accordance with the blow head assembly of the present invention, means are provided for rotating blow pin 12 through a degree of angular movement after it has been inserted into mold cavity 22. As embodied and as shown in FIGS. 1 and 4, this means preferably comprises a hydraulic cylinder 26 connected through suitable linkage to an extension 28 of blow pin 12 and providing incremental rotation to the blow pin every time the pin is inserted into the cavity. The required mechanical linkage will be obvious to those skilled in the art and since it forms no part of the present invention will not be discussed in any greater detail. The purpose of rotating blow pin 12 is to ensure smooth molding of the neck portion of the bottle as well as to cut the excess material or flange 30 away from the top of the bottle.

In accordance with the invention, means are also provided for selectively supplying air to air passage 18 of rotating blow pin 12. As embodied, this means comprises an air inlet port 32 in collar 14, communicating with an annular chamber 34 around the inside surface of internal collar bore 16. A lateral conduit 36 then connects internal air passage 18 with the outer surface of blow pin 12 at a location intermediate its length, which conduit communicates with annular chamber 34 when blow pin 12 has been inserted into the mold cavity and is in the position shown in FIGS. 1 and 2. Thus, regardless of the relative rotation between blow pin 12 and fixed collar 14 of the head assembly, the air neceassary to blow mold the bottle will pass around through chamber 34, into conduit 36 and out the outlet end 20 of pin 12 whenever the pin is properly oriented vertically with chamber 34.

In accordance with a further object of this invention, means are also provided for injecting a cooling gas into the mold cavity from the discharge outlet of the rotating blow pin. As embodied, this means comprises a cooling gas inlet port 40 connected through a suitable fitting 41 to a supply of cooling gas and means defining an annular chamber extending continuously around between the outer surface of the blow pin and the inside surface of the cylindrical bore. Preferably, the annular chamber comprises an annular groove 42 around the outer surface of blow pin 12. Groove 42, when pin 12 is inserted into collar 14, thus provides an annular chamber of cross-sectional area equal to or less than the cross-sectional area of cooling gas inlet port 40. A radial conduit 44 then communicates annular groove 42 with the interior of air passage 18 of blow pin 12 and connects to one end of tubular conduit 46 that extends down through air passage 18 to an outlet end 48 adjacent the air discharge outlet 20 of blow pin 12.

Since the cooling gas cools by vaporization, it is important to maintain the gas or liquid, as the case may be, under pressure until the point of discharge into the parison to prevent premature vaporization and blocking of the cooling gas passages prior to the point of discharge from the blow pin. Accordingly, annular groove 42, radial conduit 44, and tube 46 should be of substantially equal or less cross-sectional area than the cross-sectional area of cooling gas inlet port 40.

As best shown in FIGS. 1 and 2, groove 42 is located on pin 12 so that it communicates with inlet port 40 when the pin has been inserted into mold cavity 22 and the air passage has been connected up with the air inlet port, regardless of the relative rotation between pin 12 and collar 16.

In accordance with a further object of this invention, deflector means are attached to the outlet end of the cooling gas tube 46 to ensure breakup and uniform distribution of the flow of cooling gas into the parison. As embodied and as best shown in FIG. 4, the deflector means comprises a U-shaped tubular conduit 50, attached at one end of the "U" to the outlet end 48 of tube 46 and having a U-shaped, cross-section opening to the inside of the U-shaped deflector. Thus, as cooling gas is discharged from tube 46, it is prevented from spraying directly towards the bottom of the parison and is distributed in a more uniform manner within the interior of the parison, thus making more efficient use of the cooling gas and decreasing curing time.

From the above description, it can be seen that this invention provides a blow head assembly which can be operated to uniformly and rapidly mold a parison by injecting a cooling gas with the air used for blow molding while simultaneously permitting rotation of the blow pin with respect to the mold cavity.

The invention in its broader aspects is not limited to the specific details shown and described and departures may be made from such details without departing from the principles of the invention and without sacrificing its chief advantages.

What is claimed is:

1. A blow head assembly for injecting cooling gas during blowing of the parison comprising:
   a. a collar having an internal cylindrical bore;
   b. an axially reciprocating and fully rotatable blow pin mounted within the bore, said pin having an internal axially extending air passage terminating at an air discharge outlet at the bottom of the pin;
   c. means for rotating the blow pin;
   d. means for selectively supplying air to the air passage;
   e. a cooling gas inlet port located in the collar and opening into the cylindrical bore;
   f. means defining an annular chamber extending continuously around between the outer surface of the blow pin and the inside surface of the cylindrical bore, said chamber communicating with the cooling gas inlet port when air is being supplied to the air passage regardless of the relative rotational position between the pin and the collar;
   g. a radial conduit extending through the pin and communicating with the chamber; and
   h. a tube communicating at one end with the radial conduit and extending down through the air passage to a cooling gas outlet at the other end adjacent the air discharge outlet of the pin, said inlet port, annular chamber, radial conduit, and tube being of substantially similar or decreasing cross-sectional area to prevent premature vaporization of the cooling gas prior to its discharge from the cooling gas outlet.

2. The apparatus of claim 1, wherein the means defining the annular chamber comprises a groove extending continuously around the outer surface of the blow pin.

3. The apparatus of claim 1, wherein the outlet end of the cooling gas tube includes deflector means to break up and distribute the flow of cooling gas into the parison.

4. The apparatus of claim 3, wherein the deflector means comprises a U-shaped tubular conduit attached at one end of the "U" to the outlet end of the cooling gas tube and having a U-shaped cross-section opening to the inside of the U-shaped conduit.

* * * * *